Figure 1:
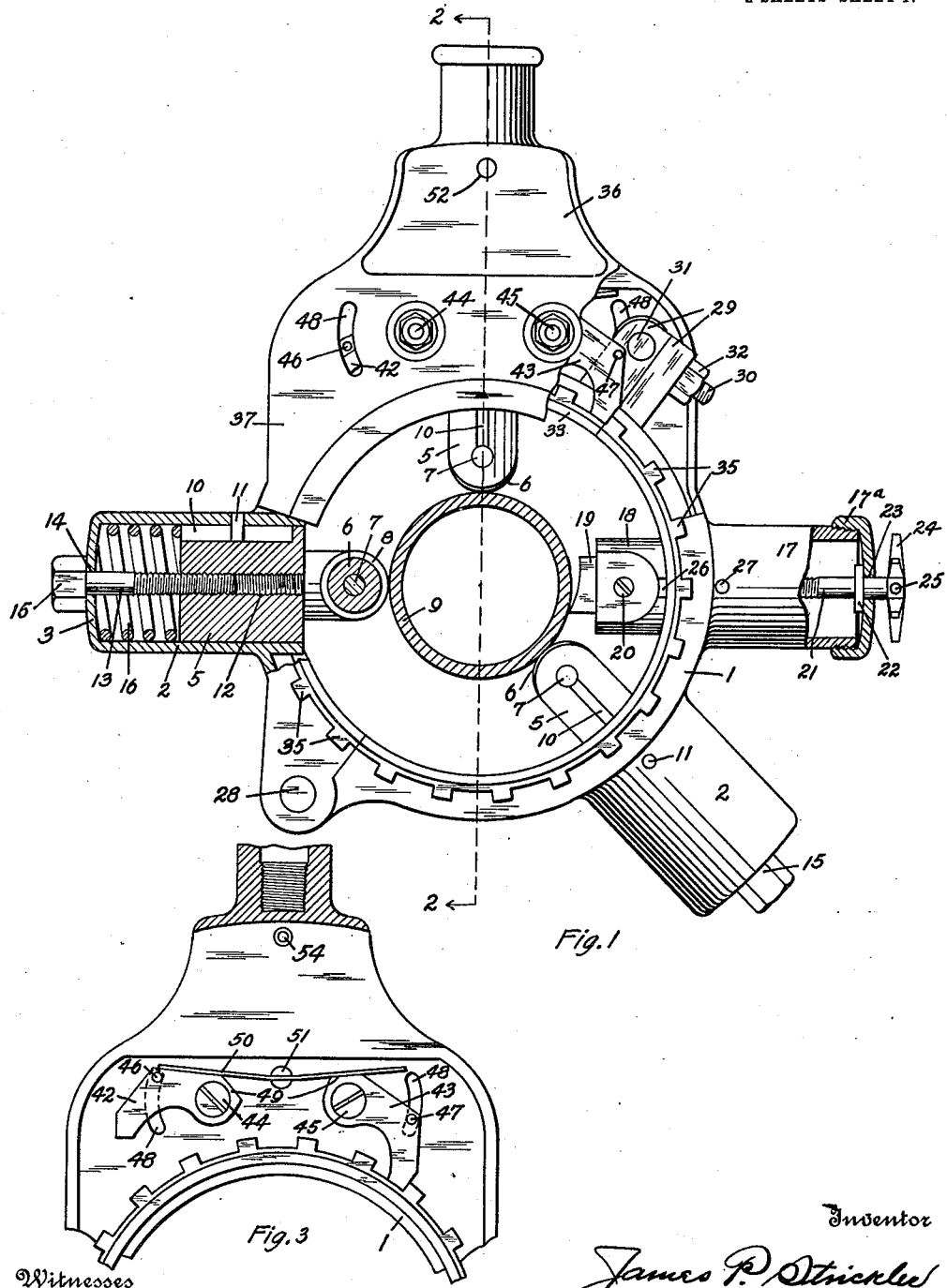

UNITED STATES PATENT OFFICE.

JAMES P. STRICKLER, OF COLUMBUS, OHIO.

PIPE-CUTTER.

1,092,304. Specification of Letters Patent. Patented Apr. 7, 1914.

Application filed January 13, 1913. Serial No. 741,727.

*To all whom it may concern:*

Be it known that I, JAMES P. STRICKLER, a citizen of the United States, residing at Columbus, in the county of Franklin and State of Ohio, have invented certain new and useful Improvements in Pipe-Cutters, of which the following is a specification.

My invention relates to pipe cutters and is particularly directed to the improvement of that type of pipe cutter used for cutting comparatively large sized pipes and is adapted for use in cutting such pipes either in a ditch or when mounted in a vise.

My invention is designed particularly as an improvement over the structure shown and described in my co-pending application Serial Number 682,146, filed March 7, 1912.

My invention contemplates essentially the provision of a pipe cutter comprising a member to be rotatably mounted upon a pipe and a cutter element. The rotatable mounting of this member upon the pipe is entirely independent of the cutter and in this manner the cutter is relieved of considerable strain which has heretofore been a common drawback in the art. To this end, I aim to provide rollers in a sufficient number and correctly spaced to securely but rotatably hold the pipe in its position. I also aim to construct this rotatable support in a manner calculated to adapt my cutter to pipes of varying size.

Another object of my invention is to resiliently mount the rollers rotatably supporting its carrying member upon the pipe being cut, in a manner that the spring acts to normally force the roller inward, but each spring is positively under control and consequently the amount of outward movement of the roller is always limited. This construction I find desirable when cutting old or corroded pipes, so that the inequality upon the exterior of the pipe may be compensated for.

In constructing my pipe cutter so that it is adjustable to accommodate the various sizes of pipes, I preferably provide screws for forcing the rollers into and out of their housings and these screws I have made left-handed in order that a right-handed movement thereof will cause an inward movement of the supporting roller. I find it a natural tendency of one not acquainted with the actual construction of my pipe cutter, to give these screws a right-handed turn to force the rollers inwardly, but in reality if a right-handed screw were used, the result would be an outward movement of the rollers. I have also used this left-handed screw in connection with the adjustment of the cutter blade itself.

I have also provided means for automatically advancing the cutter blade upon rotation of the cutter carrying member. This cutter carrying member and its complemental driving structure has been constructed to be operable either in a forward or reverse direction of movement as desired; and I have constructed my automatic cutter advancing means in accordance with this structure.

Figure 2:
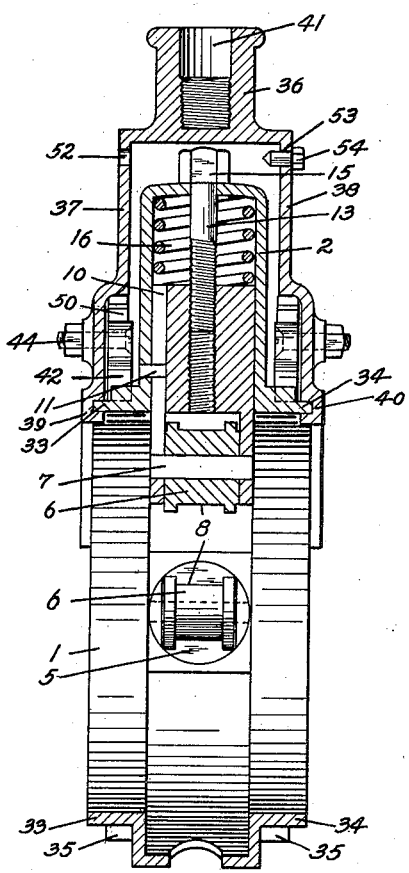

Other advantages of my invention will be apparent from the following detailed description of the same, in which similar characters of reference designate corresponding parts, and in which:

Figure 1 is a side elevation of my improved type of pipe cutter shown partly in section, Fig. 2 is a section taken on line 2—2 of Fig. 1, looking in the direction of the arrows, and, Fig. 3 is a partial side elevation showing the driving member in section, thereby disclosing the pawl and ratchet driving mechanism.

In the drawings, I have shown my pipe cutter as comprising an annulus 1 in the form of a cutter and roller carrying member. This annulus 1 is provided with radially outwardly extending guideways or housings 2 preferably closed at their outer ends as at 3 and suitably bored for the reception of supporting members 5 bifurcated at their lower ends and supporting rollers 6 by means of the axle pins 7. The rollers 6 are preferably made with an annular channel 8 as more clearly disclosed in Fig. 2. With this structure of roller, the pipe shown in section at 9 may be securely gripped and sufficient space allowed so that the rotation of the cutter carrying member is not impeded by the cutting bur. The roller supporting members 5 are preferably provided with key seats 10 adapted for coaction with the plugs or keys 11 which maintain the rollers and their carrying members in proper alinement. The roller supporting members 5 are also bored and tapped as at 12, for the left-handed screw 13 operating through an aperture 14 of the guideways 2 and having an integral head 15. From the description of the rollers thus far given, it will be apparent by turning the left-handed screw 13 to the right, will operate to force the rollers and their supports inwardly. In order that the cutter as a whole may be applied to pipes having a roughened or corroded surface, I interpose a spring 16 between the head of the guideways 2 and the roller support 5, in which case the rollers are resiliently held in their extended positions, but are under positive control as regards their limit of movement. The annulus 1 is also provided with a guideway 17, preferably having an open top and closed by the threaded cap 17ª. This guideway 17 is designed for the slidable reception of the cutter carrying member 18, carrying the cutter blade 19 removably secured thereto by the set screw 20. The cutter-carrying member 18 is bored and tapped similar to the supports 5, for the reception of the left-handed screw 21 provided with an integral shoulder 22 and operating through an aperture 23 in the cap 17ª. On to the outer extremity of the screw 21, I have fastened a star wheel 24 by means of the pin 25 for the purpose of automatically advancing the cutter blade, as will be hereinafter described. The cutter support 18 is also key-seated as at 26 and coacts with a key 27 for maintaining the proper cutting position, this action being similar to the action of the supports 5 for the rollers 6.

The annulus 1 is made in sections and pivotally secured together as at 28 and held in locked position by the abutting ears 29, one of which pivotally carries an eye bolt 30 at 31, the other ear being slotted so that the bolt may be swung into the position shown in Fig. 1 of the drawings and the two sections held together by the application of the nut 32. The annulus 1 has its edges 33 and 34 finished for a purpose to be hereinafter described and is also provided with a series of rack teeth 35.

To facilitate the ready application of my pipe cutter to a pipe, particularly when in a ditch, I provide a driving member 36 bifurcated to form legs 37 and 38 having concave lower edges of substantially semi-circular form. The lower edge of each leg is provided with a semi-annular trackway 39 and 40 adapted to slidingly engage the finished edges 33 and 34 of the annulus 1 as clearly shown in Fig. 2. The upper end of the driving member is bored as at 41, for the reception of any preferred type of oscillating handle. Coöperatively mounted upon each side of the driving element 36 and with respect to the rack teeth 35, are driving pawls 42 and 43 pivotally mounted as at 44 and 45 having laterally projecting finger holds 46 and 47 operating through arcuate slots 48 in the driving element. It is obvious that only one of these driving pawls on each side of the driving member is in engagement with the rack teeth at one time and I have, therefore, provided each pawl with an angular edge 49. A leaf spring 50 rigidly mounted as at 51 is adapted to bear upon the pawls as shown in Fig. 3, to resiliently maintain them in or out of engagement with the rack teeth. Each side of the upper portion of the legs 37 and 38 is bored as at 52 and 53 for the reception of a driving plug 54, which plug is adapted to engage the star wheel 24 for advancing the cutter blade 19 during its movement past the driving element. If the movement of the annulus 1 is in the direction indicated by the position of the pawl in Fig. 1, the driving plug 54 is mounted as shown in Fig. 2, but if it is desired to reverse this direction of movement, the cutter blade 19 must also be reversed, the pawls 43 thrown out of engagement and the pawls 42 into engagement whereupon it is necessary to change the position of the plug 54 to engage the hole 52 to correctly advance the cutter 19.

The operation of my device is as follows: The driving element 36 is moved into a position upon one section of the annulus 1 to permit of the sections being swung apart by release of the bolt and nut structure 30 and 32. It will be apparent that it is not necessary to remove the driving element from its position upon one section of the annulus to facilitate its embracing attachment to the pipe being cut. After this embracing position has been assumed, the nut 32 is drawn into position to securely lock the two sections of the annulus together and the rollers 6 and their complemental structures adjusted to firmly embrace the pipe. In this position, it will be noted that the rotatable mounting of the annulus 1 upon the pipe is entirely independent of the cutter blade 19, or in other words, the cutter blade does not serve in any way as a support for the annulus upon the pipe. If the pipe has an irregular contour due to corrosion or faulty construction, these slight inequalities are taken care of by the resilient mounting of each roller, it being understood that the springs 16 are sufficiently tensioned to securely hold each roller normally in its correct position. As a result of the left-handed screws 13, turning of the screw head 15 to the right, which ordinarily is the natural tendency, will advance each roller to its correct position and likewise, the left-handed screw 21 being turned to the right by the star wheel 24 either by hand or automatically by means of the driving plug 54 during the rotation of the annulus, will advance the cutter blade 19 to its correct position. As will be apparent, oscillating the driving element 36 a sufficient number of times in any desired manner, will completely sever the pipe being operated upon. It will also be apparent that the cutter blade 19 travels centrally in the path of the rollers 6 and in this manner prevents any tendency toward lateral wabbling.

What I claim, is:

1. A pipe cutter comprising a rotatable member, rollers on said member for rotatably supporting said member on the pipe being cut, all of said rollers being adjustable, and a cutter on said member independent of the support of said member on said pipe.

2. A pipe cutter comprising a rotatable member, rollers on said member for rotatably supporting said member on the pipe being cut, all of said rollers being adjustable, a cutter on said member independent of the support of said member on said pipe, a driving element and means for imparting rotation to said member by oscillating said element.

3. A pipe cutter comprising a rotatable member, rollers on said member for rotatably and yieldingly supporting said member on the pipe being cut, all of said rollers being adjustable, a cutter on said member independent of the support of said member on said pipe, a driving element, and means for imparting rotation to said member by oscillating said element, said cutter being mounted to travel centrally in the path of said supporting rollers.

4. A pipe cutter comprising a rotatable annulus, rollers on said annulus for rotatably supporting the pipe being cut, a cutter, a driving element for rotating said annulus and formed with trackways for slidingly engaging the edges of said annulus, and a pawl and ratchet structure connection between said element and said annulus.

5. A pipe cutter comprising a rotatable annulus formed with smooth edges, rollers on said annulus for rotatably supporting the pipe being cut, said rollers being adjustable to various sizes of pipes, an adjustable cutter carried by said annulus independent of the support of said annulus on said pipe, a substantially semi-circular driving element formed with trackways for slidingly engaging the edges of said annulus, and a pawl and ratchet structure connection between said element and said annulus.

6. A pipe cutter comprising a rotatable member, rollers for rotatably supporting said member on the pipe being cut, a cutter carried by said member, a driving element, means for imparting rotation to said member by oscillating said element, said means being operable in either forward or reversed direction of movement of said element as desired, and means for automatically advancing said cutter upon rotation of said element in either direction of movement.

7. A pipe cutter comprising a rotatable member, rollers on said member for yieldingly and rotatably supporting said member on the pipe being cut, all of said rollers being adjustable, a cutter on said member independent of the support of said member on said pipe, a driving element, means for imparting rotation to said member by oscillating said element, said cutter being mounted to travel centrally in the path of said supporting rollers.

8. A pipe cutter comprising a rotatable member, rollers on said member for rotatably supporting said member on the pipe being cut, all of said rollers being adjustable, springs normally tending to move said rollers inwardly, means for positively controlling and limiting said inward movement, and a cutter on said member.

9. A pipe cutter comprising a rotatable member, rollers on said member for rotatably supporting said member on the pipe being cut, all of said rollers being adjustable, springs normally tending to move said rollers inwardly, means for positively controlling and limiting said inward movement, a cutter on said member independent of the support of said member on said pipe, a driving element, and means for rotating said member by oscillating said element.

10. A pipe cutter comprising a rotatable member, rollers on said member for rotatably supporting said member on the pipe being cut, all of said rollers being adjustable, springs normally tending to move all of said rollers inwardly, means for positively controlling and limiting said inward movement, a cutter radially adjustable on said member and independent of the support of said member on said pipe, a driving element, and a pawl and ratchet structure connection between said member and said element whereby said member is rotated by oscillating said element.

11. A pipe cutter comprising a rotatable member, a radial guideway carried by said member, a roller structure adjustable in said guideway, a left-handed screw for adjusting said roller and operable when turned to the right to move said roller inwardly, a cutter, and a driving element.

12. A pipe cutter comprising a rotatable member, outwardly extending guideways on said member, rollers for rotatably supporting said member on the pipe being cut, roller supports adjustable radially in said guideways, said supports being key-seated and cooperating with a key in said guideways, a cutter on said member independent of the support of said member on said pipe, a driving element, and means for imparting rotation to said member by oscillating said element, said cutter being disposed centrally in the path of said rollers.

13. A pipe cutter comprising a rotatable member, rollers on said member for rotatably supporting it on the pipe being cut, a cutter, and resilient means for each of said rollers normally holding them against expansive movement.

14. A pipe cutter comprising a rotatable member, a cutter, a roller carried by said member, means for positively controlling and adjusting said roller inwardly, and resilient means for resisting the outward adjustment of said roller.

15. A pipe cutter comprising a rotatable member, a cutter, a roller carried by said member, means for positively controlling and adjusting said roller inwardly, resilient means for resisting the outward adjustment of said roller, and supplemental means for positively controlling and adjusting said roller outwardly.

16. A pipe cutter comprising a rotatable member, a cutter, a plurality of rollers carried by said member, means for positively adjusting all of said rollers inwardly, said means being effective to positively adjust said rollers outwardly, and resilient means for each of said rollers for resiliently holding them in their adjusted positions.

17. A pipe cutter comprising a rotatable member, a cutter element, and rollers on said member rotatably gripping the pipe and supporting said member therefrom, said element and rollers being all adjustable.

18. A pipe cutter comprising a rotatable member, a cutter element, and radially arranged rollers on said member, said rollers rotatably gripping the pipe and supporting said member therefrom, said element and rollers being all adjustable.

19. A pipe cutter comprising a rotatable member, a cutter element, rollers on said member rotatably gripping the pipe, means for adjusting said cutter element and each of said rollers, and guides on said member.

In testimony whereof I affix my signature in presence of two witnesses.

JAMES P. STRICKLER.

Witnesses:
  WALTER E. L. BOCK,
  A. L. PHELPS.

---

Copies of this patent may be obtained for five cents each, by addressing the "Commissioner of Patents, Washington, D. C."